United States Patent Office 3,496,253
Patented Feb. 17, 1970

3,496,253
POLY(VINYL CHLORIDE)-DIALLYL PHTHALATE MOLDING POWDERS
James P. Hamilton, Pasadena, Md., and Daniel A. Lima, Westport, Conn., assignors to FMC Corporation, New York, N.Y.
No Drawing. Filed Nov. 7, 1966, Ser. No. 592,320
Int. Cl. C08f 29/18
U.S. Cl. 260—884          2 Claims

ABSTRACT OF THE DISCLOSURE

This invention relates to a method of making dry, free-flowing, homogeneous poly(vinyl chloride) molding powders containing catalyzed allylic monomers as heat polymerizable plasticizers mixing the catalyzed allylic monomer with a dispersion grade poly(vinyl chloride) resin in a heavy duty mixer to form a putty like mix, drying the mix and pulverizing the dried mix to a powder.

---

This application relates to free-flowing, dry blend, poly(vinyl chloride) molding powders containing allyl monomers as heat polymerizable plasticizers for such compositions, and more particularly to the use of a plastisol process for producing these molding powders.

Free-flowing, dry blend molding compositions composed of poly(vinyl chloride) resin (hot mix type), a primary plasticizer, stabilizer, and fillers and pigments where desired have been compounded for a number of years. Poly(vinyl chloride) hot mix resins are finely divided solids which can be blended with the plasticizer by hot processing to form plastic film, sheeting and extruded shapes.

The general method of compounding plasticized dry blend molding compositions is to heat poly(vinyl chloride) resins to 65 to 70° C. in a mixer, and spray the plasticizer on to the hot resin where the plasticizer is absorbed. Unfortunately pigments and fillers used in these molding compositions often separate from the plasticized resin particles during shipment and handling; resulting in nonuniform molded products.

Plasticized dry blend molding compounds are desirable because they handle easily, eliminate the need for pelletizing, flow easily during molding and completely fill out intricate molds. However, the plasticized compounds produce soft molded products so that rigid products which flow easily cannot be made in this fashion. Various methods of increasing rigidity, while retaining easy flow during molding, have been suggested. Polymerizable plasticizers which function as plasticizers during the initial molding but cure upon prolonged heating so that they cease to function as plasticizers produce rigid products.

United States Patent No. 3,125,546 describes the use of poly(vinyl chloride) suspension polymers (i.e., hot mix type) in preparing hot mill sheets (at 120° C.) using allylic monomers as polymerizable plasticizers. When these sheets were compression molded the allylic monomers polymerized so they no longer functioned as plasticizers and a rigid product was formed. Unfortunately these sheets are not readily adaptable to use in transfer molding, injection molding, or an extrusion process. The sheets may be broken up into granules; however, granules, especially those made from colored compounds tend to have an orange peel or honeycomb appearance when the granules are fused together in the molded product.

The principal object of this invention is to provide a method for preparing free-flowing, dry, homogeneous, filled poly(vinyl chloride) molding compositions with good flow during molding and which heat cure to rigid or semi-rigid products. This and other objects will be apparent from the following disclosure.

We have found that dry, free-flowing, homogeneous poly(vinyl chloride) resin molding powders containing catalyzed allyl monomers as polymerizable plasticizers can be prepared by using a modified plastisol technique. Additionally, molding compounds may be prepared, where desired, with varying degrees of rigidity by using catalyzed allyl monomers together with primary plasticizers. Moreover, either dispersion grade or hot mix grade poly(vinyl chloride) resins may be used in this novel modified plastisol process.

A plastisol is simply a mixture of a dispersion grade poly(vinyl chloride) resin with a plasticizer to form a liquid colloidal dispersion of resin in plasticizer which can be fused with heat into a solid product. Vinyl dispersion resins are non-porous, finely divided solids having a particle size somewhat smaller than that of hot mix resins. The nonporous nature of these resins allow their formulations into pastes and the more fluid mixes called plastisols, by the addition of a relatively large amount of plasticizer.

In the present novel process catalyzed monomer and other liquid ingredients which are to be formulated into the molding powders are blended together and then added to the dry ingredients, which consist primarily of a dispersion grade poly(vinyl chloride) resin and filler, on a suitable mixer and these ingredients are mixed together until sufficient solvation of the poly(vinyl chloride) resin occurs to form a mix with a putty-like consistency. This process departs from conventional plastisol processing as the putty-like mix is removed from the mixer, caked, dried at 65 to 70° C. and ultimately powdered to form a homogeneous free-flowing dry molding powder.

An alternate mixing procedure is to withhold all or part of the filler until dispersion of the resin in the plasticizer is complete; the withheld filler is then added with mixing until the mix has a putty like consistency. The putty like mix is further processed to a dry homogeneous molding composition according to the above described process.

Dispersion grade poly(vinyl chloride) resins are conventionally used in preparing plastisols, however, these resins are not generally used in producing molding powders. On the other hand, hot mix type poly(vinyl chloride) resins are *not* generally adaptable to processing by the plastisol technique. However, where desired hot mix type poly(vinyl chloride) resins can be used in this novel process by ball-milling together for several hours the poly(vinyl chloride) resin, fillers, dry stabilizers, and other dry ingredients to be incorporated in the molding powder. The catalyzed allyl monomer and other liquid ingredients are separately blended together and then added to the previously ball-milled dry ingredients on a mixer, and mixed until the mix has a putty-like consistency. The putty-like mix is then caked and dried at 65 to 70° C. and powdered to form a homogeneous free-flowing dry powder. Thus the free-flowing dry molding compounds prepared by the method of this invention can be prepared from either of the two basic types of poly(vinyl chloride) resin, i.e., dispersion resins or hot mix type resins.

By "poly(vinyl chloride) dispersion resin" we mean a homopolymer or copolymer of poly(vinyl chloride)

which is sufficiently nonporous and of sufficiently small particle size that is capable of forming a plastisol with conventional primary plasticizers. Suitable copolymers are those containing a major amount of poly(vinyl chloride) copolymerized with another vinyl monomer such as vinylidene chloride, various dialkyl maleates including ethyl and butyl maleate, vinyl acetate, various dialkyl acrylates including ethyl and butyl acrylate and many others.

Vinyl dispersion resins are prepared by emulsion polymerization of vinyl chloride in an aqueous medium using a water soluble catalyst and an emulsifying agent as is well known to those skilled in the art. The resin is most commonly recovered by spray drying. Vinyl dispersion resins are readily distinguishable from other resins by their small particle size. The average particle size of vinyl dispersion resins is generally in the range of about 0.1 to 5 microns, and more commonly in the range of about 0.5 to 2 microns.

The method of this invention is adaptable to the use of "hot mix" type poly(vinyl chloride) resins. By "hot mix type poly(vinyl chloride) resin," we mean a homopolymer or copolymer of vinyl chloride which may be designated by the manufacturer as either general purpose grade or dry blending grade resin. These resins are of a relatively large particle size varying from 40 to 300 microns in size; a common particle size range is 75 to 150 microns, and the average particle size is about 75 microns. The general purpose resins are dry, fluffy and very absorptive of plasticizers, the dry blending resins are coarser, of a higher density and more uniform porosity and less absorptive of plasticizer than the general purpose grade hot mix resins, but they absorb plasticizers readily when heated. These resins will not form useful plastisols with conventional primary plasticizers using conventional plastisol compounding techniques.

Suitable hot mix type poly(vinyl chloride) copolymers are those containing a major amount of poly(vinyl chloride) copolymerized with another vinyl monomer such as vinylidene chloride, various dialkyl maleates including ethyl and butyl maleate, vinyl acetate, various dialkyl acrylates including ethyl and butyl acrylate, and many others.

Hot mix type poly(vinyl chloride) resins are generally prepared by suspension polymerization of vinyl chloride. Suspension polymerization is generally carried out in an aqueous medium using a monomer-soluble peroxide catalyst, suspending agent, and a small amount of emulsifying agent as is well known to those skilled in the art.

Molding powders capable of producing products of varying rigidity can be prepared by the novel process of this invention by utilizing catalyzed allyl monomers together with primary poly(vinyl chloride) plasticizers. When the molding powders are heat processed, the polymerizable monomer is cured and the molded products will be either rigid or semi-rigid depending upon the ratio of allyl monomer to primary solvating plasticizers used in the compositions. Where no primary plasticizer is used the molded product will be truly rigid.

The catalyzed allyl monomers are used in the dry free-flowing molding compositions in normal plasticizer concentrations, i.e., in the amount of about 20–60 parts of allyl monomer per 100 parts of poly(vinyl chloride) resin by weight. Where desired a primary plasticizer, preferably of a high solvating type, such as dimethoxyethyl phthalate, can be used in amounts of 0–30 parts per 100 parts of poly(vinyl chloride).

Heat stabilizers are used in poly(vinyl chloride) compositions to prevent decomposition of the poly(vinyl chloride) due to the heat exposure during processing. Relatively high heat stabilizer levels are sometimes used in these compositions due to the extensive heat exposure to which the compositions are exposed. As much as 10 parts of some stabilizers such as dibasic lead phosphite are used in these compositions per 100 parts of resin.

Fillers generally used in poly(vinyl chloride) resin compositions may be used in these novel compositions. General purpose fillers such as calcium carbonates, talcs, and clays are used in the amount of 0.30 parts per 100 parts of poly(vinyl chloride) resin. Higher filler levels may be used in compounds in which the best physical properties are not required.

Pigments used in vinyl molding and coating compositions can generally be used in these novel poly(vinyl chloride) molding powders. Titanium dioxide, cadmium selenide red and orange, phthalocyanine green and blue, chromium and cadmium yellow, chromium oxide pigments, and other pigments which are insensitive to peroxygen chemicals and strenuous oxidative attack may be used in these molding powders.

Allyl monomers such as diallyl orthophthalate, diallyl maleate, diallyl fumarate, diallyl chlorendate, diallyl isophthalate and the like are generally useful in practicing this invention. Diallyl orthophthalate is the preferred monomer because of its relatively low volatility which results in minimal loss during processing and because it is readily available as a commercial product at a moderate price.

The free-flowing dry molding compounds prepared according to the process described above can be compression or transfer molded to form rigid products, and with care they can be extruded. Additionally, these compounds can be sheeted on a roll mill at temperatures below the catalyst activation temperature to form films or sheets. These catalyzed films or sheets can then be compression molded at normal temperatures in matched metal molds or vacuum formed to make rigid or semi-rigid products.

The free-flowing dry molding powders of this invention perform best when a free radical catalyst or accelerator is used to accelerate the cure of the allyl monomer. About 0.2 to 1.2 parts by weight of catalyst, based on the amount of allyl monomer used, is generally sufficient to accelerate the cure of the monomer. Suitable catalysts for use in these novel molding powders include dicumyl peroxide, tertiary butyl peroxide, tertiary butyl perbenzoate, tertiary butyl hydroperoxide and other catalysts well known in the art to be useful in curing allylic monomers.

The resins, plasticizers, stabilizers, fillers, pigments and catalysts used in the formulation disclosed herein are well known in the trade, and are extensively described in the technical data bulletins of the various suppliers of these ingredients.

The following typical examples of formulations which are illustrative of the compounds which can be prepared by practicing this invention are given by way of example and not by way of limitation. All parts and percentages are by weight.

EXAMPLE 1

The following ingredients were mixed together according to the procedure below:

| | Parts by weight |
|---|---|
| Poly(vinyl chloride) resin, hot mix type | 100 |
| Diallyl orthophthalate | 60 |
| Dibasic lead phosphite | 10 |
| Calcium carbonate | 10 |
| Dicumyl peroxide | 1.2 |

The resin, dibasic lead phosphite and calcuim carbonate were ball-milled together for several hours. The peroxide catalyst was dissolved in the diallyl phthalate monomer and the wet blend was added to the dry ingredients in a heavy duty mixer and mixed until sufficient solvation occurred to form a putty-like mix. The mix was then caked and dried at 65° C., and powdered to form a homogeneous free-flowing dry powder. The free-flowing dry powder was compression molded for 15 minutes at 350° F. The molded product was hard and brittle.

This example was repeated using only 30 parts of diallyl phthalate with similar results. The example was repeated a third time using only 20 parts of diallyl phthalate monomer with similar results. The samples with lower monomer content did not flow as easily during molding as the example containing 60 parts of diallyl phthalate.

EXAMPLE 2

The following ingredients were mixed together as outlined below:

| | Parts by weight |
|---|---|
| Poly(vinyl chloride) resin, hot mix type | 100 |
| Diallyl orthophthalate | 30 |
| Dimethoxyethyl phthalate | 30 |
| Dibasic lead phosphite | 10 |
| Calcium carbonate | 10 |
| Dicumyl peroxide | 0.8 |

The resin, filter and stabilizer were ball-milled together for two hours. The peroxide catalyst was dissolved in diallyl phthalate monomer and the dimethoxyethyl phthalate was added thereto and all of the wet ingredients blended together. The wet blend was added to the dry ingredients in a heavy duty mixer and mixed until they formed a putty-like mix. The putty-like mix was caked and dried at 68° C. and powdered to form a homogeneous free-flowing dry powder. The free-flowing dry molding powder was compression molded to form a semi-rigid product. The molded product was somewhat less rigid but tougher than the molded products of Example 1.

EXAMPLE 3

The following ingredients were mixed together according to the procedure outlined below:

| | Parts by weight |
|---|---|
| Poly(vinyl chloride) resin, dispersion grade | 100 |
| Diallyl orthophthalate | 60 |
| Dibasic lead phosphite | 10 |
| Calcium carbonate | 30 |
| Dicumyl peroxide | 0.6 |

The peroxide catalyst was dissolved in the diallyl orthophthalate monomer and the wet ingredients were added to the dry ingredients in a heavy duty mixer and mixed until a putty-like consistency was obtained. The putty-like mix was then caked and dried at 68° C. and then powdered to form a homogeneous, free-flowing dry powder. The free-flowing dry powder of this example was compression molded to form a rigid product which was hard and brittle.

EXAMPLE 4

The following ingredients were blended together according to the procedure outlined below:

| | Parts by weight |
|---|---|
| Poly(vinyl chloride) resin, dispersion grade | 100 |
| Diallyl orthophthalate | 30 |
| Dimethoxyethyl phthalate | 20 |
| Dibasic lead phosphite | 10 |
| Calcium carbonate filler | 30 |
| Dicumyl peroxide catalyst | 1.0 |

The dry ingredients were blended together. The peroxide catalyst was dissolved in the diallyl phthalate monomer and blended with the other wet ingredients. The wet blend was then added to the dry ingredients in a heavy duty mixer and mixed until a putty-like consistency was obtained. The putty-like mix was then caked and dried at 68° C., and then powdered to form a homogeneous free-flowing dry powder. The dried blend of this example was compression molded at 350° F. for 15 minutes to form a semi-rigid product which was both hard and tough.

EXAMPLE 5

The dried blends of Examples 1, 2, 3 and 4 were transfer molded to form rigid products. All of these molding compounds transfer molded well and generally filled out a spiral test mold. The molding compounds of Examples 2 and 4 exhibited better flow properties than those of Examples 1 and 3.

EXAMPLE 6

The molding powders of Examples 1, 2, 3 and 4 were sheeted out on a roll-mill to form sheets. The sheets were flexible when removed from the roll-mill. The sheets were compression molded at 350° F. for 15 minutes to form rigid products. The products molded from the compounds of Examples 2 and 4 were semi-rigid and tougher than the products molded from the compounds of Examples 1 and 3.

EXAMPLE 7

The molding powders of Examples 1, 2, 3 and 4 were sheeted out on a roll-mill below the decompositon temperature of the free radical catalyst. The roll-mill sheets were vacuum formed under conditions such that the product achieved a temperature of 350° F. for 15 minutes. The compounds of Examples 1 and 3 form rigid products and the compounds of Examples 2 and 4 form semi-rigid products.

EXAMPLE 8

Other allyl monomers were evaluated employing the procedure of Example 1 and are reported below:

| | Parts by Weight | | | |
|---|---|---|---|---|
| | (a) | (b) | (c) | (d) |
| Poly(vinyl chloride) resin, hot mix type | 100 | 100 | 100 | 100 |
| Diallyl maleate | 60 | | | |
| Diallyl fumarate | | 60 | | |
| Diallyl chlorendate | | | 60 | |
| Diallyl isophthalate | | | | 60 |
| Dibasic lead phthalate | 10 | 10 | 10 | 10 |
| Calcium carbonate | 30 | 30 | 30 | 30 |
| Tertiary butyl peroxide | 0.6 | 0.6 | 0.6 | 0.6 |

All of these samples resulted in homogeneous, free-flowing, dry powders. Compression molding at 350° F. for 15 minutes yields a rigid product. Repeating these samples using a dispersion grade resin and the mixing procedure of Example 3 gives similar results.

Obviously, the examples can be multiplied indefinitely without departing from the scope of the invention which is defined in the following claims.

What is claimed is:

1. A method of making dry, free-flowing, homogeneous poly(vinyl chloride) molding powders containing catalyzed allylic monomers comprising ball-milling hot mix poly(vinyl chloride) resin for several hours, mixing a catalyzed allylic monomer selected from the group consisting of diallyl orthophthalate, diallyl maleate, diallyl fumerate, diallyl chlorendate, and diallyl isophthalate with a ball-milled hot mix poly(vinyl chloride) resin on a heavy duty mixer to form a putty-like mix, heating the putty-like mix at 65-70° C. to form a dry cake, and powdering the dry cake.

2. A method of making a plasticized dry, free-flowing homogeneous poly(vinyl chloride) molding powders containing catalyzed allylic monomers according to the method of claim 1, further comprising blending a plasticizer with catalyzed allylic monomer, mixing the blend of plasticizer and catalyzed monomer with the ball-milled hot mix grade pol(vinyl chloride) resin on a heavy duty mixer to form a putty-like mix, heating the putty-like mix at 65–70° C. to form a dry cake, and powdering the dry cake.

References Cited

UNITED STATES PATENTS

| | | | |
|---|---|---|---|
| 2,618,621 | 11/1952 | Burt | 260—884 |
| 3,074,905 | 1/1963 | Douglas | 260—884 |
| 3,157,713 | 11/1964 | Leese | 260—884 |
| 3,329,642 | 7/1967 | Lima et al. | 260—884 |
| 3,351,604 | 11/1967 | Safford et al. | 260—884 |
| 3,359,193 | 12/1967 | Pinner | 260—884 |
| 2,665,263 | 1/1954 | Howald | 260—861 |
| 2,958,669 | 11/1954 | Hoffman | 260—34.2 |
| 3,414,534 | 12/1968 | Huitson | 260—31.8 |

OTHER REFERENCES

Penn, W. S.: PVC Technology, McLaren & Son Ltd., London, 8/66, TP 1180, V 48, P 4, Pages 24, 25, 209, 220, 221.

SAMUEL H. BLECH, Primary Examiner

M. J. TULLY, Assistant Examiner

U.S. Cl. X.R.

260—31.8, 34.2, 41, 45.75

UNITED STATES PATENT OFFICE
CERTIFICATE OF CORRECTION

Patent No. 3,496,253  Dated February 17, 1970

Inventor(s) James P. Hamilton, et al

It is certified that error appears in the above-identified patent and that said Letters Patent are hereby corrected as shown below:

Column 2, line 21, "non-porous" should read --nonporous--.

Column 4, line 4, "0.30" should read --0-30--.

Column 5, line 20, "filter" should read --filler--.

Column 6, line 75, "pol" should read --poly--.

Signed and sealed this 30th day of November 1971.

(SEAL)
Attest:

EDWARD M. FLETCHER, JR.　　　　　ROBERT GOTTSCHALK
Attesting Officer　　　　　　　　　Acting Commissioner of Patents